May 16, 1944. R. A. OSWALD 2,348,841
RACING ARENA AND PHOTOGRAPHING APPARATUS
Filed Sept. 3, 1941 3 Sheets-Sheet 2
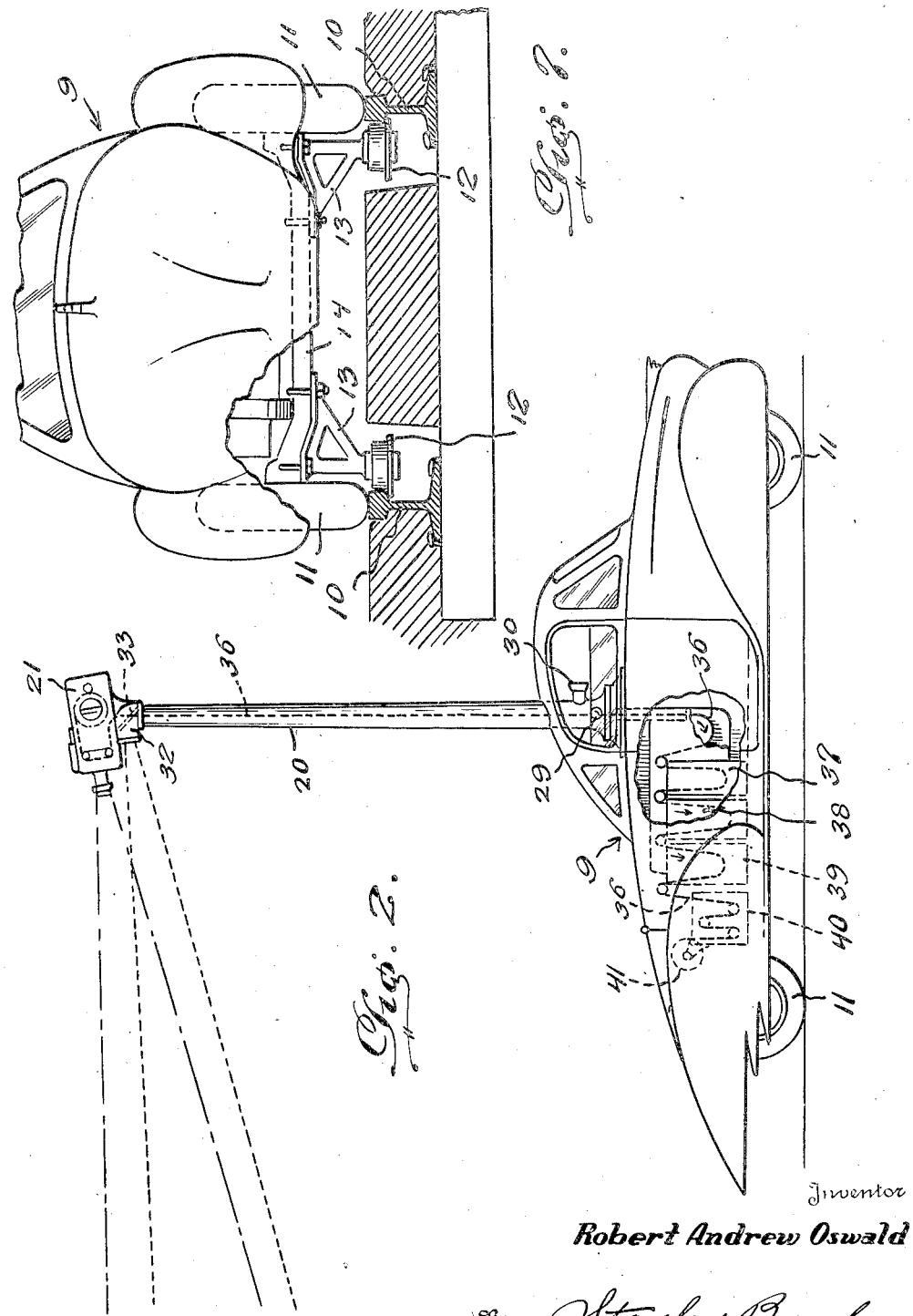
Inventor
Robert Andrew Oswald
By Stanley Burch
Attorney May 16, 1944. R. A. OSWALD 2,348,841
RACING ARENA AND PHOTOGRAPHING APPARATUS
Filed Sept. 3, 1941 3 Sheets-Sheet 3
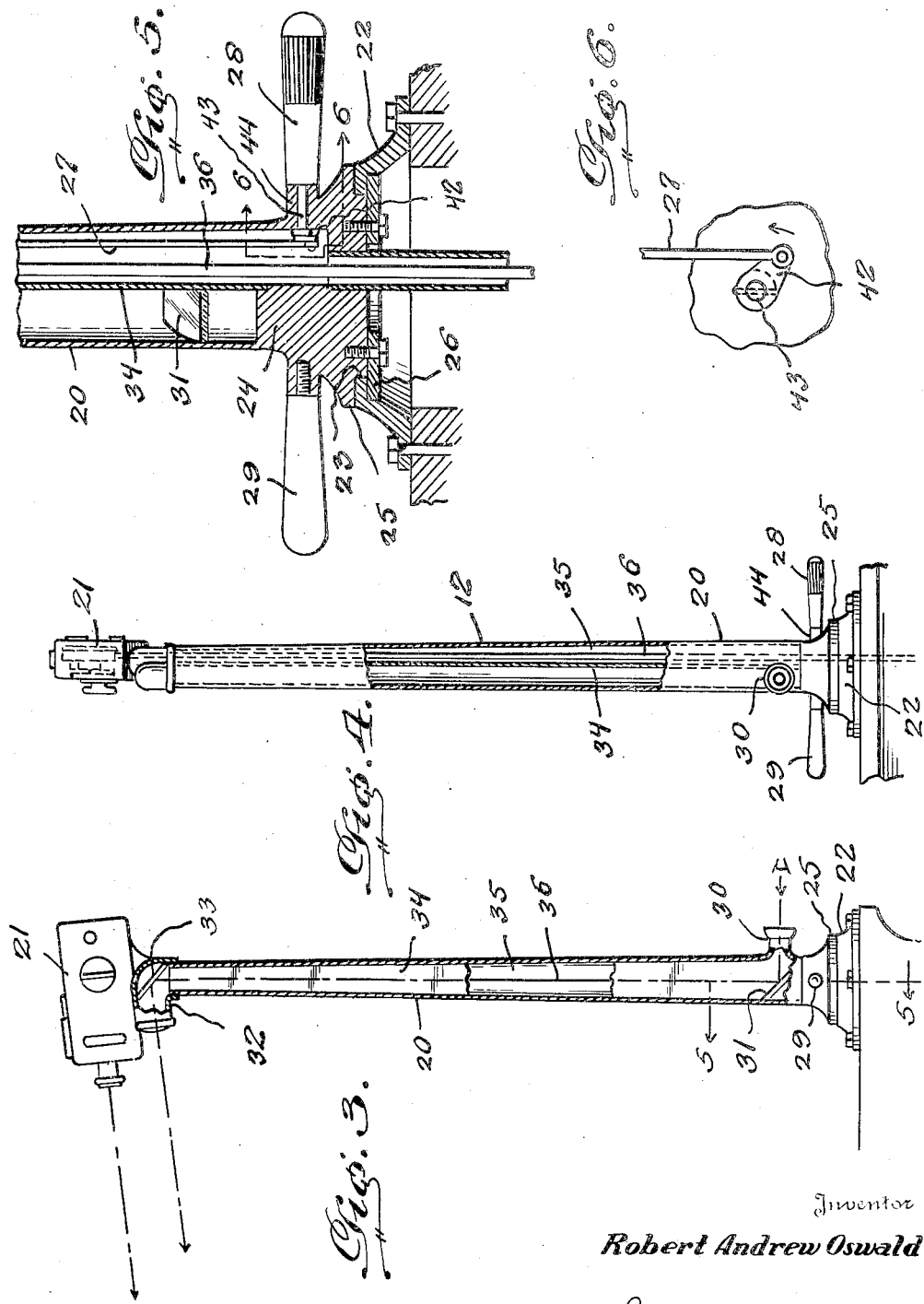
Inventor
Robert Andrew Oswald
By Stanley Burch
Attorney Patented May 16, 1944

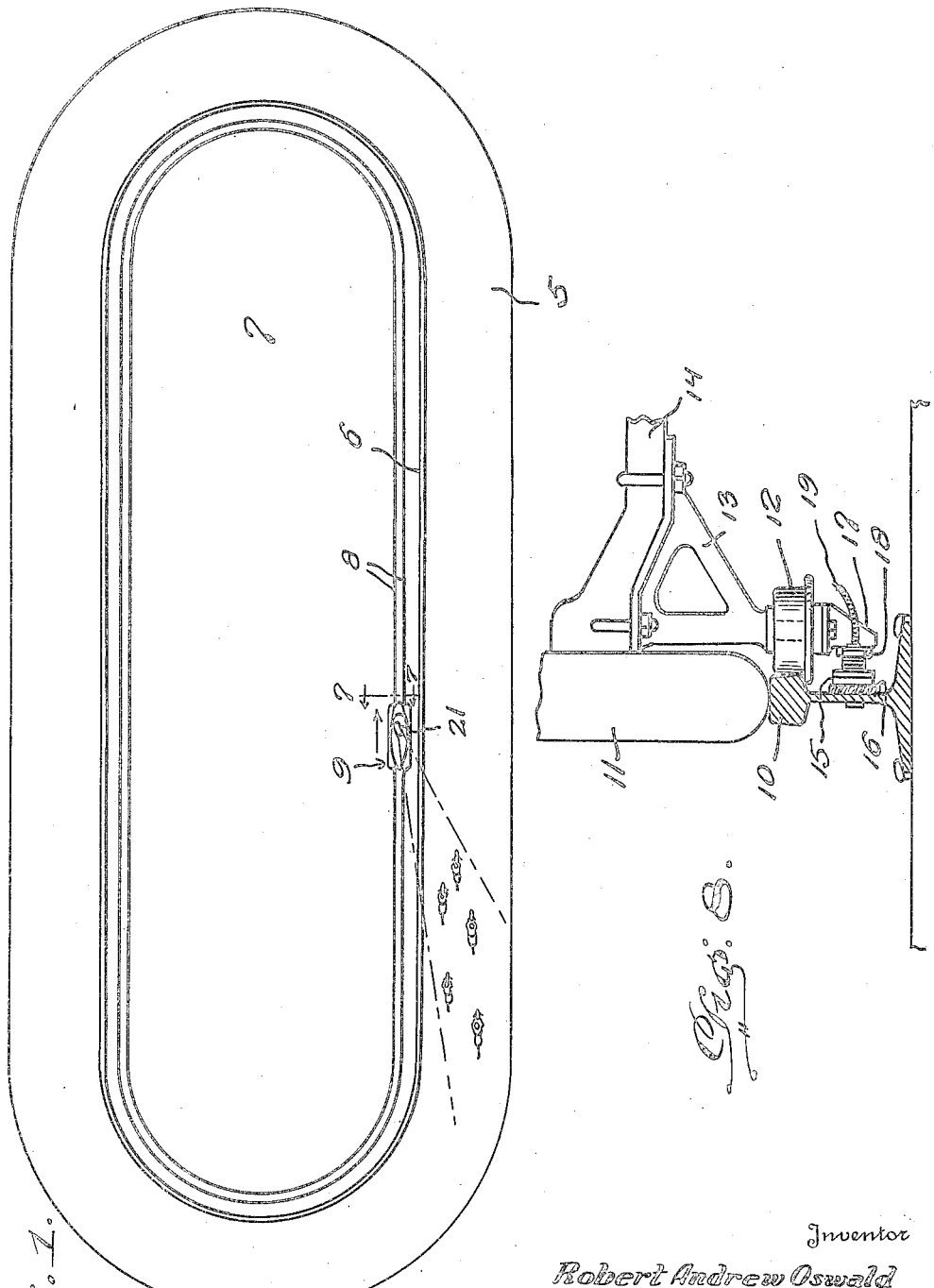

2,348,841

UNITED STATES PATENT OFFICE 2,348,841

RACING ARENA AND PHOTOGRAPHING APPARATUS

Robert Andrew Oswald, San Mateo, Calif., assignor of one-half to Ross Foreman, San Mateo County, Calif.

Application September 3, 1941, Serial No. 409,437

2 Claims. (Cl. 88—16)

This invention contemplates the provision of means whereby a photographer may travel along a racing strip in close proximity to the horses during a horse race, so as to take moving pictures of the entire race which will clearly show the winner, whether fouls have been committed, and the position of every horse during the entire race. Provision is made whereby the pictures can be developed as they are taken, so that shortly after the race is over the pictures will be available, showing every detail of the race, whereby the judges may be able to review the race and ascertain the actual winner.

In carrying out the present invention, I provide a track for a photographer's car parallel with and adjacent the racing strip, and a photographer's car is provided for travel along this track, which car carries a motion picture camera movably mounted so that it can be kept focused on the horses during the race. Means are provided whereby the photographer may accurately direct the camera while the pictures are being taken and may control the operation of such camera from the car. Also, provision is made for delivering the picture film to developing and other necessary tanks in the car as the pictures are taken, so that the film is processed while the car is in motion and, by the time the race is over, the film has been processed and is ready to be viewed by the judges of the race.

Other objects and features of the present invention will become apparent from the following description when considered in connection with the accompanying drawings; in which:

Figure 1 is a plan view of a racing arena and photographing apparatus embodying the present invention.

Figure 2 is an elevational view, partly broken away, of the photographer's car shown in Figure 1.

Figure 3 is a view, partly in side elevation and partly in vertical section, showing the motion picture camera and its mounting means.

Figure 4 is a view similar to Figure 3, partly in elevation looking toward the left of Figure 3 and partly broken away and in section.

Figure 5 is an enlarged fragmentary vertical section taken on line 5—5 of Figure 3.

Figure 6 is a fragmentary section taken on line 6—6 of Figure 5.

Figure 7 is a view taken transversely through the car track of Figure 1 and showing a means for guiding the photographer's car along such track; and Figure 8 is a fragmentary view somewhat similar to Figure 7, illustrating the manner of deriving current from a third rail for operation of an electric motor when such electric motor is used to propel the photographer's car.

Referring in detail to the drawings, 5 indicates an ordinary continuous horse racing strip, along the inner side of which is erected the usual fence 6 enclosing an infield 7. In accordance with the present invention, a track 8, for a photographer's car 9, is provided along and adjacent the racing strip 5 parallel with the latter and preferably inwardly of fence 6 within infield 7 as shown. While the track 8 may consist of an ordinary roadway for a land vehicle, it preferably consists of a railway track including spaced rails 10 upon which the wheels 11 of the car 9 are adapted to run. By providing a railway track, smooth running of the photographer's car without undue jolts or vibration is insured. While the car 9 would have steering apparatus if the track 8 were a mere roadway, such steering apparatus can be eliminated when a railway track is used, means being provided on the car 9 to cooperate with the rails 10 for guiding the car 9 along the track. As shown in Figure 7, such guiding means may consist of flanged wheels 12 arranged to engage the balls of the rails 10 and journaled on vertical axes at the lower ends of mounts 13 fixed to and depending from an axle 14 of the car 9. Also, the car 9 may be driven by an ordinary power plant including an internal combustion engine, as practiced in connection with automobiles. However, if the car is provided with an electric motor for propelling the same, current for the operation of such electric motor may be derived from a third rail 15 carried by the web of one rail 10 and insulated from the latter as at 16 in Figure 8. To take power from the third rail 15, the guide wheel mount 13 may be provided below the guide wheel 12 with a support 17 carrying a collector shoe 18 from which leads a conductor 19 adapted to extend to the electric motor used to propel the car. Such motor may have one side grounded to the frame of the car so that the rail 10 will act as a ground for the motor circuit as is generally common in electric railway construction.

Suitably mounted upon the body of car 9 and rising a considerable height above the same is a hollow vertical mast or column 20, said mast or column being capable of rotation about its longitudinal axis and having a motion picture camera 21 fixed upon the top or upper end thereof. The mounting means for column 20 may consist of a centrally apertured base plate 22 in the aperture of which is rotatably fitted the reduced portion 23 of a base member 24 provided on said column 20. This base member may have a flange 25 resting on the base plate 22 about its central aperture or opening, and another flange member 26 may be fastened to the bottom of the base member 24 to engage the under side of the base plate 22 about its central opening. In this way, the column is retained in an upright position although free to rotate about its vertical or longitudinal axis.

The motion picture camera 21 is of a generally well known type having a motor for causing travel of the film therein and means for controlling the operation of such motor. Such controlling means may be operated from a remote point within the body of the car 9 through the medium of an extension operating means including a rod 27 extending from the camera downwardly through the column 20 to a point near the bottom of the latter where it is operatively connected to a rotary handle 28 projecting at one side of the column within the body of the car. By simply turning handle 28 in the proper direction, the motor of the camera 21 may be started or stopped as desired. Another handle 29 may be fixed to the lower end of column 20 for use in turning the column about its longitudinal axis so as to properly direct the camera toward the subjects being photographed.

Also embodied in the column 20 is a periscope whereby the photographer within the car 9 may view the subjects and properly direct the camera toward them. For this purpose, a periscope sight 30 is provided at the bottom of column 20 in line with an angularly arranged mirror 31, and a horizontally directed viewing member 32 is provided near the top of column 20 in line with another angularly disposed mirror 33. The arrangement is such that the subjects being photographed will be reflected from mirror 33 from a line parallel with the aim of the camera, and will then be received in the mirror 31 to be clearly seen by the photographer through the viewing member 30. By the use of this periscope, accurate viewing and aiming of the camera is insured so as to take care of changing positions during the photographing of a race.

The column 20 is interiorly divided as at 34 into a passage 35 downwardly through which is passed the film 36 from the camera 21. This is done instead of winding the exposed film upon a reel within the camera, and this film passes from the lower end of column 20 successively through developing, reversing, fixing and drying tanks 37, 38, 39 and 40, the first three of which are located in a dark chamber within the body of the car 9. A suitably operated reel 41 is provided to finally have the developed or processed film wound thereon. As shown in Figure 6, the connection of the rod 27 with handle 28 may consist of a crank 42 fixed on the inner end of a shaft 43 rigid with and extending axially from one end of handle 28 and journaled in a bearing 44 projecting laterally from the column 20.

It will be seen that the film is exposed and then travels down through the column 20 into the several tanks within car 9 so that the film is processed while the car is in motion. The process is a continuous one, so that by the time the race, which is being photographed, is over, the film has been processed. As the car moves on a track parallel to a racing strip, a field of horses can be followed and accurate moving pictures can be taken of the entire race. Shortly after the race is over, the moving pictures will be available so that they may be viewed by the judges for ascertaining every detail of the race and permitting the official order of finish to be justly named or decided upon. The modification required relative to existing racing strips, and the photographer's car needed for use in connection therewith may be readily supplied at a reasonable cost, and the invention will supply a crying need in the interest of better management of horse racing.

What I claim as new is:

1. The combination with a photographer's car adapted to run upon a track and having a motor-operated motion picture camera mounted in an elevated position thereon and controllable from a point within the car whereby motion pictures of an entire race may be taken while the car is in motion traveling along the racing strip in proximity to the racers, the mounting means for said camera consisting of an upright hollow column mounted on the body of the car and having the camera mounted on the top thereof, said column being rotatable about its longitudinal axis to facilitate directing of the camera toward the subjects being photographed, and means operable by a person seated within the car for directing and controlling the operation of said camera, said last named means comprising lateral handles on the lower end of said column, one of said handles being axially rotatable, and a rod extending through the column and operatively connected at its upper end to a motor starting and stopping device at the camera and at its lower end to said rotatable handle.

2. The combination of an endless horse racing strip, and a track located parallel with and adjacent said racing strip, with a photographer's car adapted to run upon said track and having a motion picture camera mounted in an elevated position thereon and controllable from a point within the car whereby motion pictures of an entire race may be taken while the car is in motion traveling along the racing strip in proximity to the racers, the mounting means for said camera consisting of an upright hollow column mounted on the body of the car and having the camera mounted on the top thereof, said column being rotatable about its longitudinal axis to facilitate directing of the camera toward the subjects being photographed, means operable by a person seated within the car for directing and controlling the operation of said camera, processing means for the motion picture film within the body of the car, and means for delivering the exposed film from the camera downwardly through said column to said processing means.

ROBERT ANDREW OSWALD.